May 26, 1931.    O. T. NELSON    1,807,003
METAL TO METAL JOINT
Filed Nov. 18, 1927
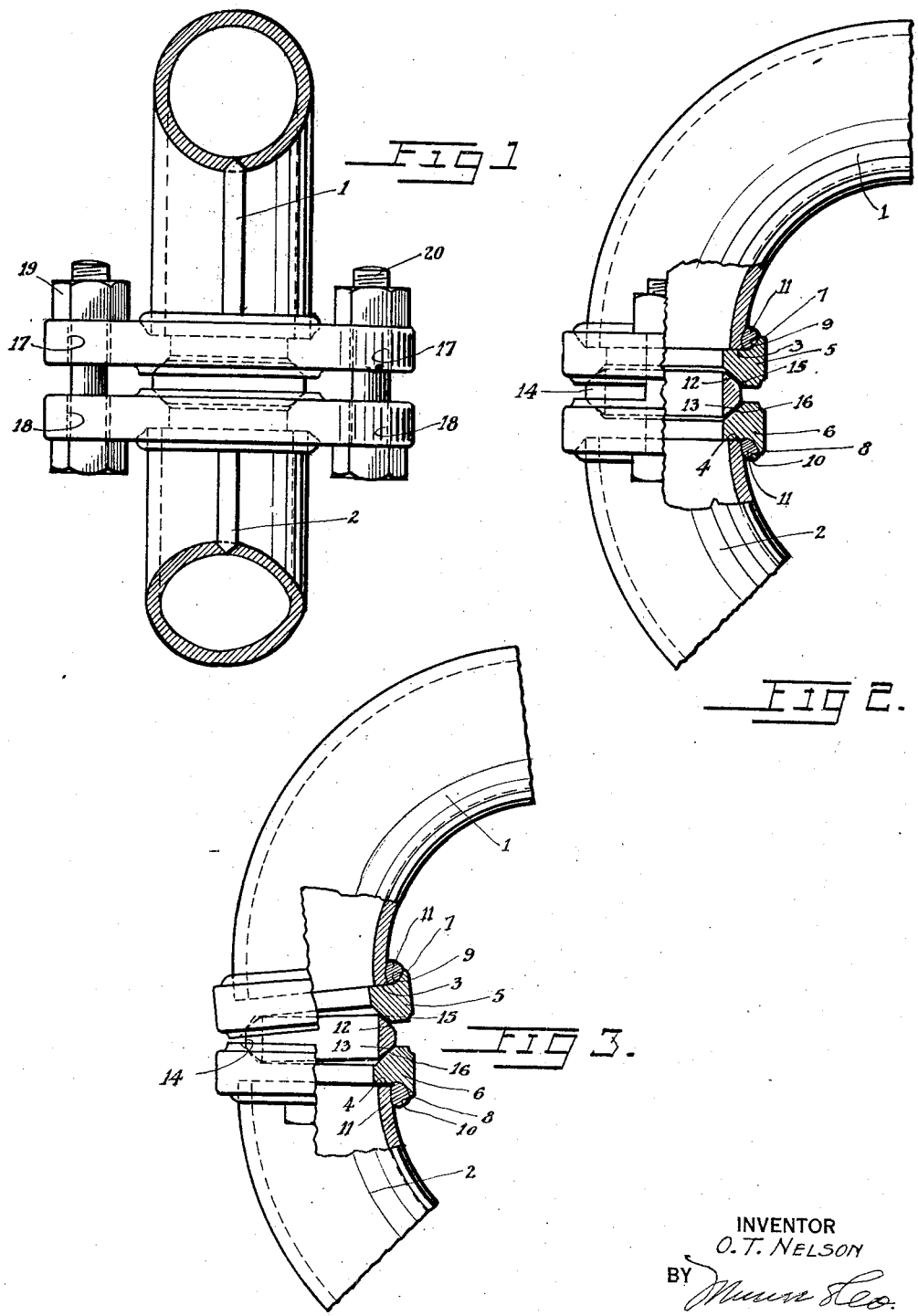
INVENTOR
O. T. NELSON
BY
ATTORNEY Patented May 26, 1931

1,807,003

UNITED STATES PATENT OFFICE

OLLIE T. NELSON, OF BRISTOL, PENNSYLVANIA, ASSIGNOR TO PACIFIC STEEL BOILER CORPORATION, OF DETROIT, MICHIGAN, A CORPORATION OF MICHIGAN

METAL TO METAL JOINT

Application filed November 18, 1927. Serial No. 234,188.

My invention relates to improvements in metal to metal joints, and it consists in the combinations, constructions, and arrangements herein described and claimed.

An object of my invention is to provide a connection for two tubular members which is steam, liquid and air-tight and which is constructed of all metal parts.

A further object of my invention is to provide a joint which may be taken apart and put back together again many times without destroying the tightness of the joint.

A further object of many invention is to provide a device of the type described by means of which the members which are secured thereto may vary in their positions with respect to each other without affecting the efficiency of the joint.

A further object of my invention is to provide a device of the type described in which the various parts are durable and efficient for the purpose intended.

Other objects and advantages will appear in the following specification, and the novel features of the invention will be particularly pointed out in the appended claim.

My invention is illustrated in the accompanying drawings, forming part of this application, in which Figure 1 is a front elevation of the device as assembled, Figure 2 is a side elevation of the device, a part thereof being broken away, and Figure 3 is a sectional view of the device showing the joined members moved out of their normal positions.

In carrying out my invention, I provide tubes or elbows 1 and 2 having ends 3 and 4, respectively. Retaining flanges 5 and 6 are disposed adjacent the ends 3 and 4 of the elbows 1 and 2. The flanges 5 and 6 are provided with outwardly extending bead portions 7 and 8, respectively, which form recesses 9 and 10, respectively, between the flanges and their respective elbows. The flanges 5 and 6 are rigidly secured to the elbows by welding, the welding material 11 being received in the recesses 9 and 10.

The flanges 5 and 6 are provided with tapered surfaces 12 and 13, respectively. A connecting ring 14 is provided with arcuate-shaped annular surfaces 15 and 16 which are arranged to engage at certain lines with the tapered surfaces 12 and 13.

The flanges 5 and 6 are provided with openings 17 and 18 which are arranged to receive bolts 19 and 20.

From the foregoing description of the various parts of the device, the operation thereof may be readily understood. In Figures 1 and 2, I have shown the elbows connected to each other through the flanges, the connecting ring and the bolts. It is obvious by viewing Figure 2 that the tapered surfaces 12 and 13 are tangent with the arcuate-shaped surfaces 15 and 16 of the ring 14. Therefore, by drawing the flanges 5 and 6 into close engagement with the ring 14 by means of the bolts 19 and 20, the elbows 1 and 2 may be secured to each other so that the connection therebetween is steam, liquid and air-tight.

Let us assume that the positions of the elbows 1 and 2 in a boiler or the like prevent them from being secured together in such a manner that the flanges 5 and 6 are parallel with each other, as shown in Figures 1 and 2. In such a formation of the elbows, it is ordinarily impossible to secure them together. However, the arcuate-shaped annular surfaces 15 and 16 of the connecting ring 14 make it possible to secure the elbows 1 and 2 together by means of the flanges 5 and 6 at any desired position with respect to each other. By viewing Figure 3, it is obvious that there is a complete connection between the flanges 5 and 6 and the ring 14 owing to the fact that the tapered surfaces 12 and 13 are tangent with the arcuate-shaped annular surfaces 15 and 16 throughout. Therefore, by drawing the flanges 5 and 6 into close engagement with the ring 14, even though the flanges are extending transversely with respect to each other, they may be rigidly secured together to form a steam, liquid and air-tight connection.

I claim:

A device of the type described comprising a pair of pipe sections, a flange carried by each pipe section, each flange comprising an annular ring having a portion arranged to abut the end of the pipe and being provided with bead portions spaced from the sides of the pipe for forming annular recesses, means disposed in said recesses for welding said flanges to the pipes, the opposite faces of the flanges being provided with tapered surfaces, a connecting ring provided with arcuate-shaped surfaces arranged to be engaged by the tapered surfaces of the flanges, and bolts carried by the flanges for drawing said flanges toward one another, whereby the ring is pressed tightly against the arcuate surfaces, thus forming a tight joint.

Signed at Bristol, in the county of Bucks and State of Pennsylvania, this eighth day of November A. D. 1927.

OLLIE T. NELSON.